United States Patent
Armellin et al.

(10) Patent No.: US 10,046,483 B2
(45) Date of Patent: Aug. 14, 2018

(54) POST-MOLDING COOLING APPARATUS FOR PREFORMS MADE OF THERMOPLASTIC MATERIAL

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Alberto Armellin, Vittorio Veneto (IT); Sandro Serra, Oderzo (IT); Michele Varaschin, Vittorio Veneto (IT); Matteo Zoppas, Conegliano (IT)

(73) Assignee: S.I.P.A. SOCIETA' INDUSTRIALIZZAZIONE PROGETTAZIONE S.P.A., Vittorio Veneto (IT)

( * ) Notice: Subject to any disclaimer, the term of this patent is extended or adjusted under 35 U.S.C. 154(b) by 218 days.

(21) Appl. No.: 14/916,469

(22) PCT Filed: Sep. 3, 2014

(86) PCT No.: PCT/IB2014/064218
§ 371 (c)(1),
(2) Date: Mar. 3, 2016

(87) PCT Pub. No.: WO2015/033273
PCT Pub. Date: Mar. 12, 2015

(65) Prior Publication Data
US 2016/0214279 A1    Jul. 28, 2016

(30) Foreign Application Priority Data

Sep. 3, 2013 (IT) .............................. RM2013A0487

(51) Int. Cl.
*F25D 25/00* (2006.01)
*F25D 25/02* (2006.01)
(Continued)

(52) U.S. Cl.
CPC .............. *B29B 13/04* (2013.01); *B29B 11/08* (2013.01); *B29C 49/6427* (2013.01);
(Continued)

(58) Field of Classification Search
CPC ......... B29B 13/04; B29B 11/08; B29B 11/12; B29K 2105/253; B29K 2067/003;
(Continued)

(56) References Cited

U.S. PATENT DOCUMENTS 4,836,767 A    6/1989  Schad et al.
5,114,327 A    5/1992  Williamson et al.
(Continued)

FOREIGN PATENT DOCUMENTS

CN    2887566    4/2007

OTHER PUBLICATIONS

International Search Report and Written Opinion dated Nov. 25, 2014 for corresponding PCT patent application No. PCT/IB2014/064218.

*Primary Examiner* — Joseph Trpisovsky
(74) *Attorney, Agent, or Firm* — Abelman, Frayne & Schwab

(57) ABSTRACT

The invention relates to an apparatus for cooling a plurality of preforms made of thermoplastic material which continuously move on a conveyor belt. The apparatus includes a cylindrical casing with a vertical extension formed by two coaxial cylinders, such a casing contains a guide crossed by a chain or a cable for transporting the preforms therein. The guide, which forms a closed path, comprises a first helical stretch, which raises from the lower plane starting from a (Continued)

station in which the preforms coming from a conveying device are hooked by the chain or by the cable, a second straight stretch, which returns the preforms to the lower plane once they have reached the upper plane, and a third flat stretch at the height of the lower plane, which returns the preforms to the arrival station. The helical stretch of the guide is contained within a cooling tunnel formed in the gap between the two walls of the outer cylinder and the inner cylinder of said casing. The cooling air is conveyed within the cooling tunnel by a specific manifold which is located within the casing.

13 Claims, 7 Drawing Sheets

(51) Int. Cl.
  B29B 13/04 (2006.01)
  B29C 49/64 (2006.01)
  B29B 11/08 (2006.01)
  B29C 49/06 (2006.01)
  B29K 67/00 (2006.01)
  B29K 105/00 (2006.01)
  B29L 31/00 (2006.01)

(52) U.S. Cl.
  CPC ........ *B29C 49/06* (2013.01); *B29K 2067/003* (2013.01); *B29K 2105/253* (2013.01); *B29L 2031/712* (2013.01)

(58) Field of Classification Search
  CPC . B29C 49/6427; B29C 49/06; B29C 47/8815; B29C 47/882; B29C 47/8845; B29C 47/885; B29L 2031/712; F25D 3/11; F25D 25/00
  USPC .................................................. 62/378, 381
  See application file for complete search history.

(56) References Cited

U.S. PATENT DOCUMENTS

| 5,787,716 | A | * | 8/1998 | Allen, Jr. | ................ | A23L 3/361 |
| | | | | | | 62/381 |
| 5,974,692 | A | * | 11/1999 | Påhlsson | ................ | A23L 3/361 |
| | | | | | | 34/147 |
| 6,299,431 | B1 | | 10/2001 | Neter | | |
| 2002/0081347 | A1 | | 6/2002 | Dubuis et al. | | |
| 2004/0244400 | A1 | * | 12/2004 | Lang | ..................... | A21B 1/245 |
| | | | | | | 62/378 |
| 2011/0247355 | A1 | * | 10/2011 | McCormick | ............. | A21B 1/26 |
| | | | | | | 62/381 |
| 2013/0167562 | A1 | * | 7/2013 | Braithwaite | ............. | F25D 3/11 |
| | | | | | | 62/63 |

* cited by examiner

POST-MOLDING COOLING APPARATUS FOR PREFORMS MADE OF THERMOPLASTIC MATERIAL

CROSS REFERENCE TO RELATED APPLICATIONS

This application is a national phase of PCT application No. PCT/IB2014/064218, filed Sep. 3, 2014, which claims priority to IT patent application No. RM2013A000487, filed Sep. 3, 2013, all of which are incorporated herein by reference thereto.

FIELD OF THE INVENTION

The present invention relates to a production plant for containers made of thermoplastic material, for example PET, and in particular to a cooling apparatus used in said plants.

STATE OF THE ART

The production of very high numbers of thermoplastic containers, in particular of bottles, is a process which starting from the raw material, generally polyethylene terephthalate or PET, allows to obtain finished containers of even particularly complex shape suited to the most varied market needs, and which are particularly light and strong even when subjected to heavy pressures at ambient temperature. The transition of PET in raw state in the form of granules to plastic container can be carried out either by means of a one-stage process or by means of a two-stage process, as desired.

The one-stage process is carried out using a single plant in which the transition of PET from granules to preform, by means of a step of injecting into molds, and the transition from preform to plastic container, by means of a step of stretching-blowing, occurs continuously without the preform being allowed to cool down completely to ambient temperature. The preform thus still preserves part of the latent heat remaining from the step of injecting, with a considerable saving of energy, because the preforms require less heat to be returned to the temperature suitable for blowing with respect to the case in which they must be heated starting from ambient temperature. A so-called two-stage process instead is carried out in two plants which are generally but not necessarily separate: one production plant carries out the first part of the container production process with the transition of PET in granules to preform, i.e. carries out the step of injecting of the PET preforms in injection molds. The second part of the process which transforms the preform into the final container in a blower using the stretching-blowing technique, which is generally used today for blowing PET containers, is carried out in the second production plant. The two-stage process can also be carried out in the same production plant, which includes injecting the preforms and blowing them into bottles, but the two operations are carried out at different times. The preforms are firstly cooled in special cooling systems to reach ambient temperature and are then stored while awaiting to be introduced into appropriate ovens to return them to the temperature necessary either for performing the typical blowing process of the employed thermoplastic or for stretching-blowing, if PET is used.

So-called starwheels, comprising a rotational wheel provided with a series of grippers having extendable arms provided with jaws, can be used in plants constituted by rotatory carousels for conveying the preforms or the formed containers. Some problems concerning production plants of this type for PET containers are higher automation capacity, higher reliability, increased preform transfer speed from one station to the other, reduced maintaining times and, above all, reduced production times. Highly automated systems must be used in order to increase the preform production capacity and to reduce the permanence time of the preforms in the molding modules and the time necessary for a first cooling of the preform to make it sufficiently solid on the outside in order to be able to be hooked by the grippers of the transfer starwheels without risk of deformation. Minimizing these times may imply the risk of forming crystalline zones unless a rapid transfer system of the preforms to an efficient cooling system, in which the preform can be returned to ambient temperature, is available. The need is thus felt to make new production plants with rotatory machine for containers, in particular made of PET, to respond to the market need of increasing productivity, and thus, for the aforesaid reasons, also new, more effective cooling systems.

SUMMARY OF THE INVENTION

It is the object of the present invention to provide a plant for producing thermoplastic containers, in particular PET preforms, which solves the aforesaid problems. One of these problems concerns, in particular, the preform cooling time. The solution is a new cooling apparatus which may be used in high-speed preform rotatory production systems, i.e. a cooling apparatus for preforms made of thermoplastic material, in particular of PET, which comprises:

a) a guide for the preforms, which defines a closed path comprising:
   a first substantially helical stretch, which develops about a vertical middle axis, such a stretch being comprised between a lower plane and an upper plane with a start point at the height of the lower plane and an end point at the height of the upper plane,
   a second substantially straight stretch, arranged inside the helical stretch, which starts in said end point and continues from the top downwards ending at the lower plane, and
   a third stretch, located at the lower plane which joins an end point of the second stretch with the start point of the helical stretch.
b) a cooling tunnel inside which the turns of the first helical stretch of said guide run.

Advantageously, the guide is crossed by a chain or by a cable onto which a series of clips are hooked, which grasp the preforms either in the neck zone or directly on the specific neck ring, holding them clamped and from which the preforms can be detached by applying an extraction force. Advantageously, the cooling tunnel appears as a rectangular section tube with greater symmetry axis arranged in vertical direction coinciding with the symmetry axis of the preforms, and having size in the same order of size as the preforms, such a tube following the same helical path as the guide and containing it. Advantageously, a double wall cylindrical casing with vertical rotation axis coinciding with the vertical central axis of the guide contains the cooling system, the outer vertical walls of the tunnel being formed by the outer wall of said casing and the vertical inner walls of the cooling tunnel being formed by the inner wall of the casing, while the two upper and lower walls of the cooling tunnel are constituted by two helical belts which follow the path of the guide.

The independent claims describe preferred embodiments of the invention forming an integral part of the present description.

BRIEF DESCRIPTION OF THE FIGURES

Further features and advantages of the invention will be more apparent in light of the detailed description of a preferred, but not exclusive, embodiment described as a function of an apparatus for producing plastic containers of the injection-compression type, illustrated by way of non-limiting example, with the aid of the accompanying drawings, wherein.

The same reference numbers and letters in the figures refer to the same members or components.

DETAILED DESCRIPTION OF A PREFERRED EMBODIMENT OF THE INVENTION

Figure 1:
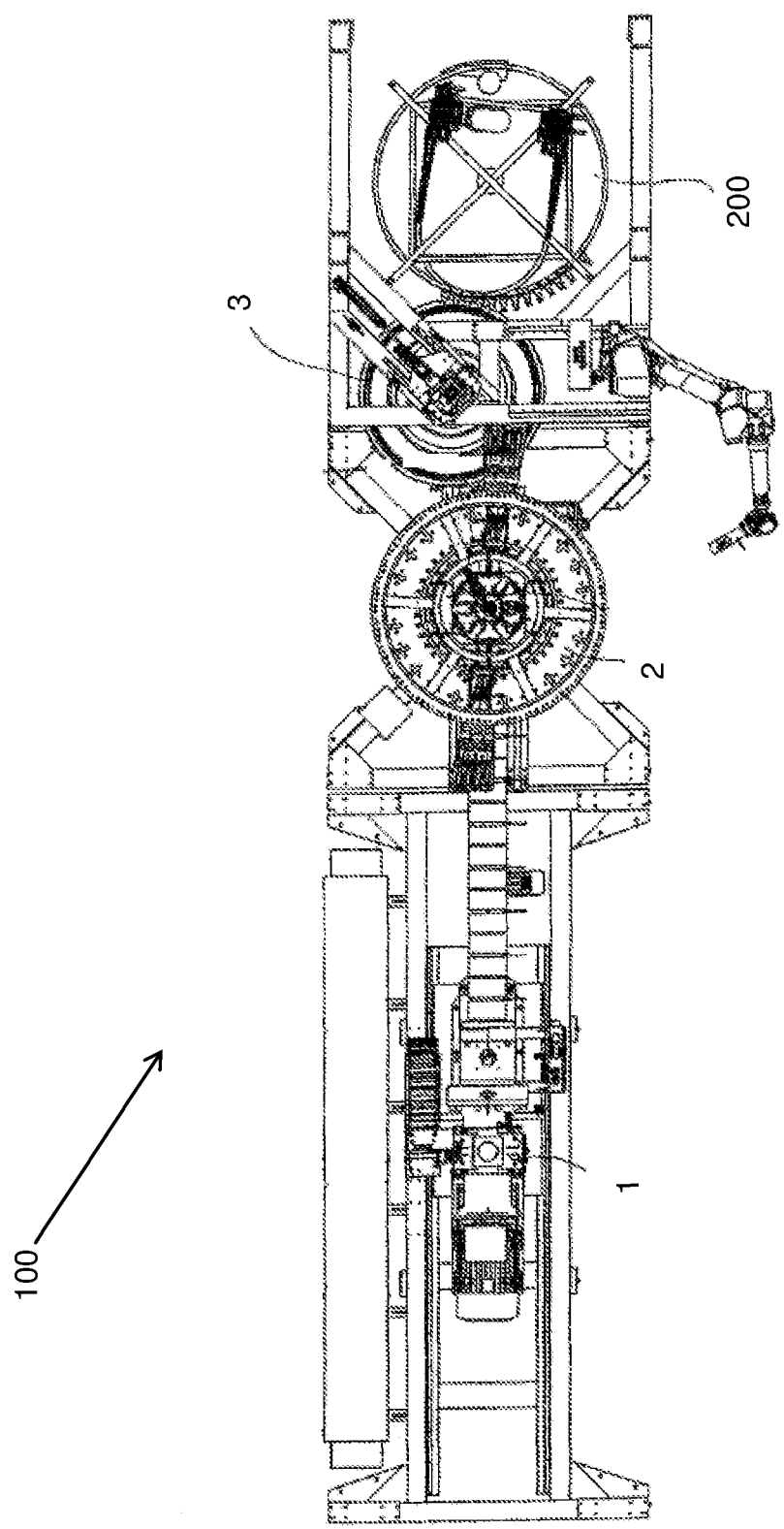
FIG. 1 is a diagrammatic plan view of a thermoplastic container production plant in which the cooling apparatus according to the invention is incorporated.

FIG. 1 is a diagrammatic plan view of a plant for manufacturing containers made of thermoplastic material, in particular of preforms, typically made of PET. Such a production plant typically, but not exclusively, comprises:
a) an extruder 1, the function of which is to plasticize the polymer transforming it from the granular solid state to the fluid state, with the contribution of energy provided by specific heaters and by the friction forces which are generated due to the action of the extruding screw, thus producing melted resin;
b) a molding apparatus, which produces the preforms by injection-compression and comprises a rotatory carousel 2, which can rotate about a vertical axis;
c) a cooling apparatus 200 of the manufactured preforms.

Figure 2:
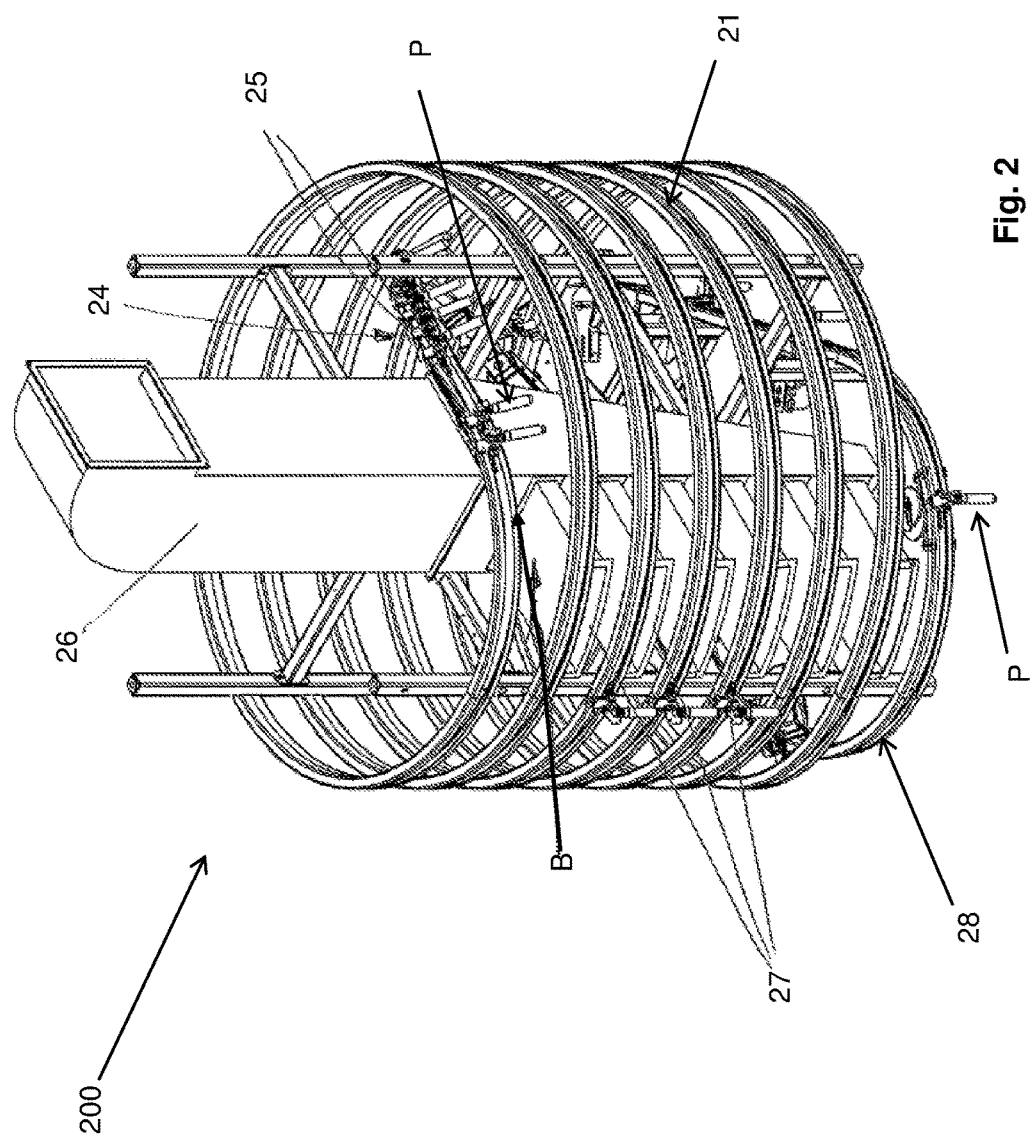
FIG. 2 is an axonometric view of a part of the cooling apparatus of the invention.
Figure 3:
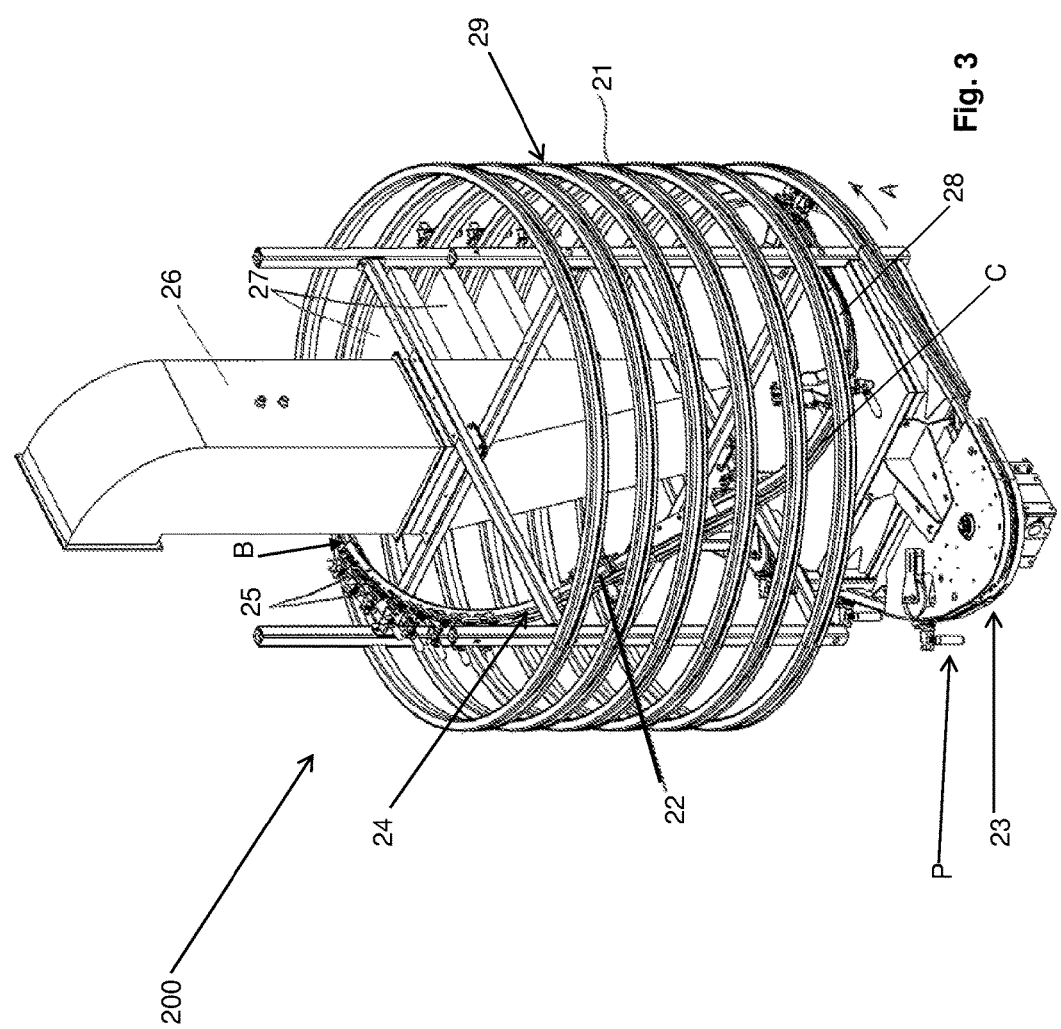
FIG. 3 is another axonometric view of the cooling apparatus rotated by 180° with respect to the view of FIG. 2.

A device for distributing the melted resin produced by extruder 1 to each mold arranged on the outer periphery of carousel 2 is provided between the extruder 1 and the rotatory carousel 2. Once made, the preforms must therefore be transferred by means of transfer carousels 3 to be further processed. The preforms are used to make bottles or other containers, either food-grade or not, by means of a further blowing or stretching-blowing operation. A production plant of the type employing an injection-compression apparatus instead of other molding apparatuses currently used in the industry offers, among other advantages, that of higher productivity because the rotary carousel of the molding apparatus can be operated at rotation speeds which are faster than the hourly production rate of the alternative press molds of conventional type. The step of cooling of the preforms is provided at the end of the molding operation. Such a configuration, with intermediate cooling, is typical of a two-stage container production plant. As mentioned above, the cooling operation is a sensitive operation also considering the production times, which obviously tend to decrease. In a preform, the outer surfaces naturally cool before the inner "core", which tends to remain hot, with the risk of heating the outer surface of the preform again once the preform is removed from the molding module, and this can cause serious manufacturing faults, which cause it to be rejected. In order to avoid these problems, the cooling must occur rapidly outside the injection-compression molds. The keeping of the preforms in the molding cavities unacceptably extends manufacturing times. It is thus necessary to extract the partially cooled preforms from the molding cavities as soon as they can be transported, i.e. are sufficiently solid to be transported, by the transfer starwheel 3 to a cooling apparatus 200 where they must be rapidly and efficiently cooled to ambient temperature. The periphery of the transfer starwheel 3 is provided with grippers to grasp the preforms and continuously transfer them without needing to interrupt the rotation either of the rotatory carousel where the preforms are manufactured or of the carousel where they are cooled. The cooling apparatus 200, which we will described, may be used in any preform production plant, and thus not only in the described production plant 100 which includes an injection-compression molding apparatus with rotatory carousel; use in such a production plant is described by way of example only, because it is a high-speed, high-capacity production plant. The cooling apparatus 200 according to the invention will now be described in greater detail with reference to FIGS. 2 and 3. The cooling apparatus 200 is substantially a vertical structure with a cylindrical external shape. This solution allows a considerable saving of space if compared to structures which are substantially developed along a horizontal plane. The cooling apparatus 200 comprises a guide 21 defining a closed path which starts from the level of a lower plane in the starting point indicated by the arrow A (FIG. 3) following a first helical stretch 29 consisting of a given number of turns which develop in vertical direction, and thus end on the level of an upper surface in the end point, indicated by the arrow B (FIG. 2). Starting from this point B, the path returns to the lower plane following a second, substantially straight inclined stretch 22 (FIG. 3) within said first helical stretch 29. Having reached the lower plane, the path returns to starting point A following a third, substantially flat stretch 28 on the level of the lower plane. Before reaching point A, the path passes through a station 23 (FIG. 3), in which the preforms P are transferred from the transfer starwheel 3 to the cooling apparatus 200. The turns of the helical stretch 29 have a mutual distance in vertical direction, helicoid pitch, in the order of length of the preform. The guide 21 is crossed by a chain 24 or by a cable onto which a series of clips 25 are hooked, which can grasp the preforms either in the neck zone or directly on the specific neck ring holding them clamped and from which the preforms can be detached by applying an extraction force. The chain 24 follows said closed path. The preforms P, already partially cooled in the molding cavities and transported by the transfer starwheel 3, are hooked by the clips 25 at the height of the station 23, then cross the guide 21 and, after having been cooled, reach the stretch 28, in which one or more devices are present which release the preforms P from the clips 25 then conveying them towards a zone for storage or further treatment, according to the design of the production plant.

Figure 4A:
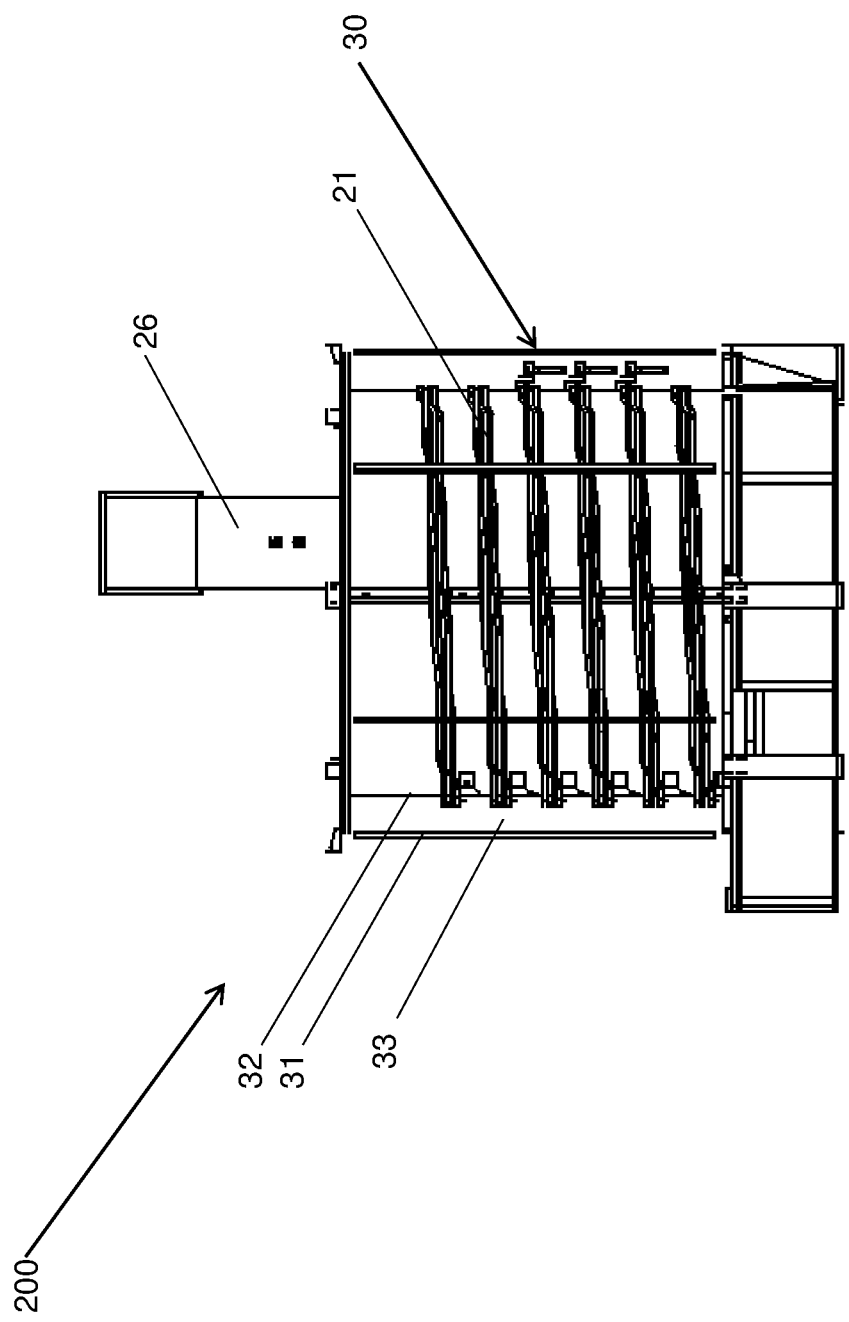
FIG. 4a, 4b are two views of the cooling apparatus.
Figure 4B:
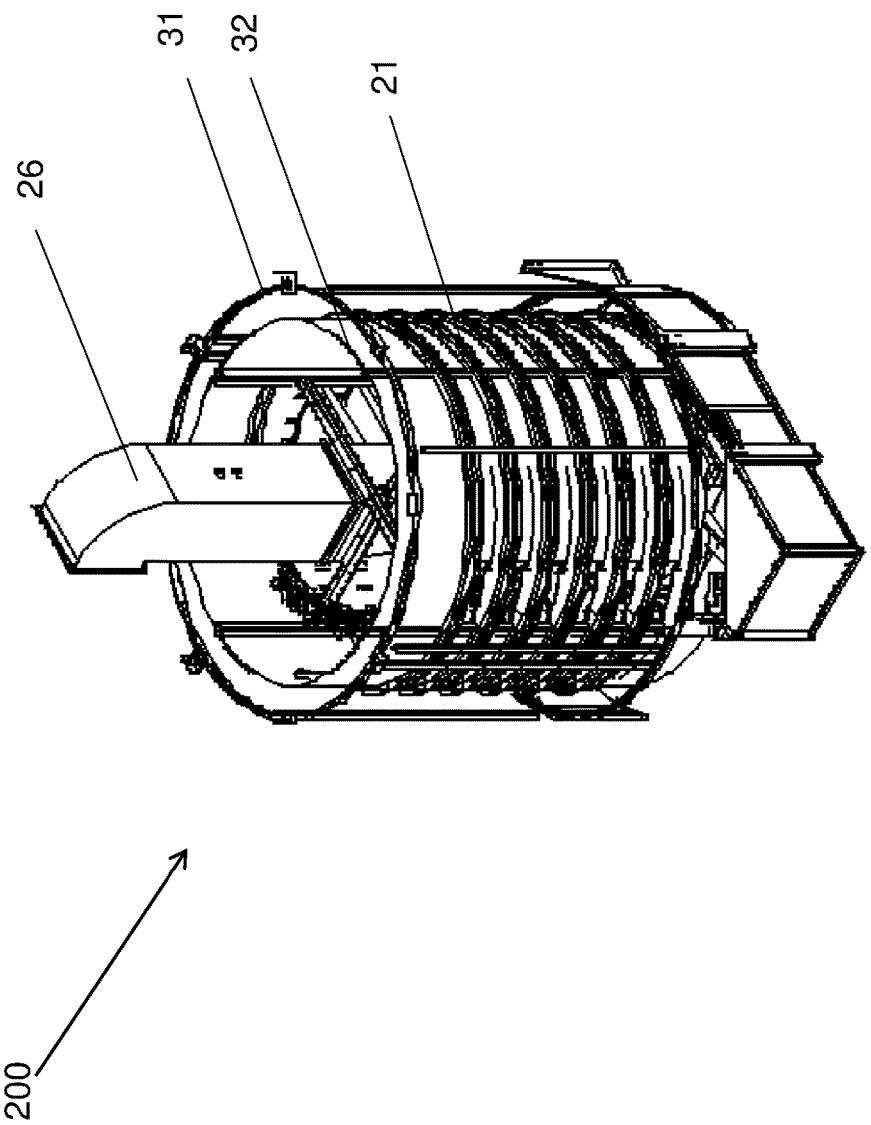
Figure 5:
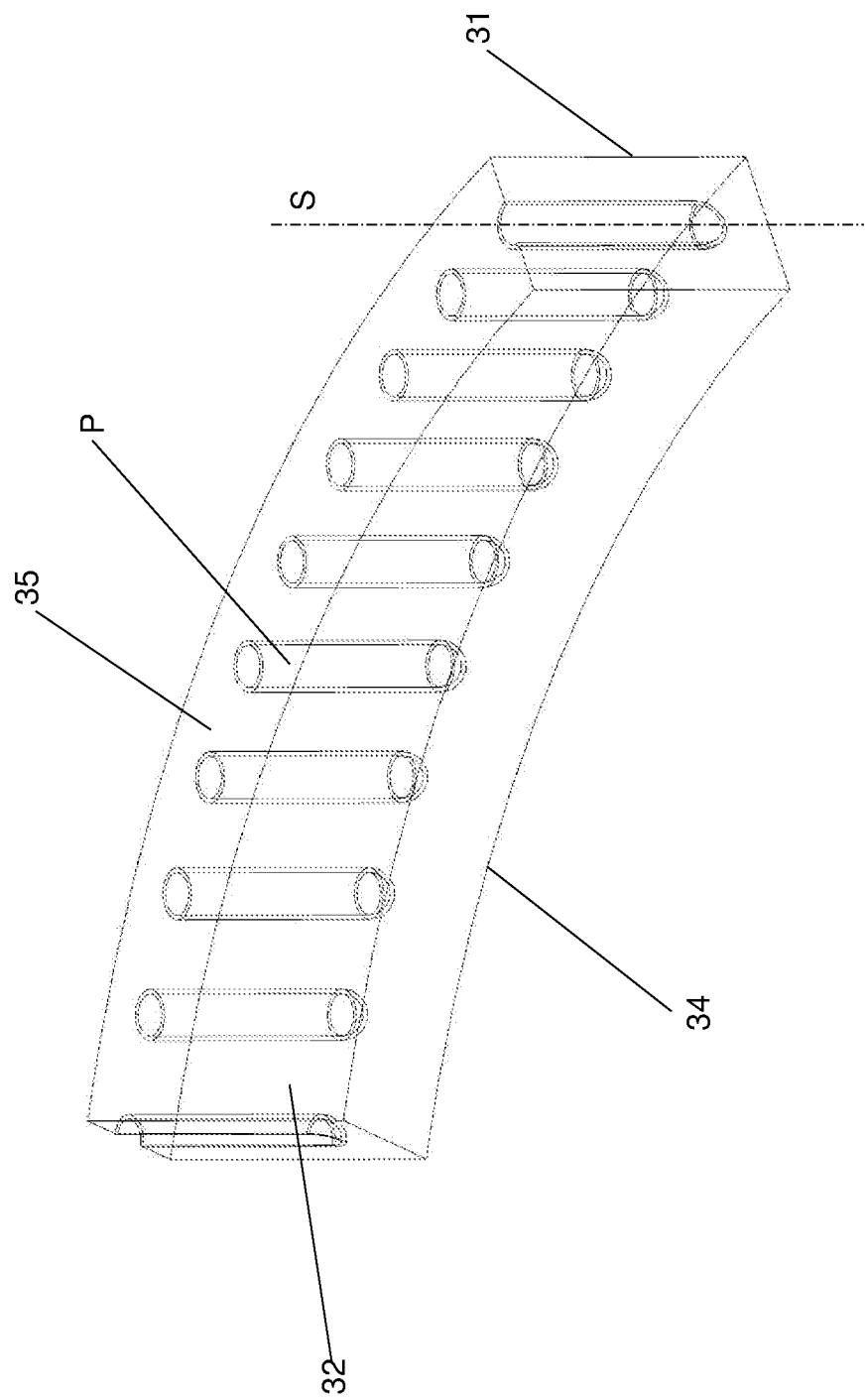
FIG. 5 is a stretch of cooling tunnel with preforms therein.

In order to further increase the efficiency of the preform cooling process, the cooling apparatus 200 comprises a casing 30 for containing the cooling air flow (see FIG. 4a). Such a casing 30 is formed by two coaxial cylinders, one outer 31 and the other inner 32, having a difference of diameter such to be able to contain the turns of the helical stretch 29 of the guide 21 and the preforms which cross such a stretch within the gap 33 formed by their walls. The helical stretch 29 contained between the two coaxial walls runs within a specific tunnel which is used to convey the cooling air. The cooling tunnel, a stretch of which is shown in FIG. 5, is substantially a rectangular section pipe which follows the same path as the helical stretch 29 of the guide 21 thus containing it. The symmetry axis S of the rectangular section of the tunnel is in vertical position and is parallel to the symmetry axis of the preforms P. The size of the cooling tunnel is in the order of size of the preforms P. The tunnel is formed by the vertical walls of the outer cylinder 31 and by the inner cylinder 32 which constitute the casing 30, and by two metallic belts 34 and 35, which follow the helical stretch 29 of the guide 21 and which define the lower and upper walls of the cooling tunnel.

Figure 6:
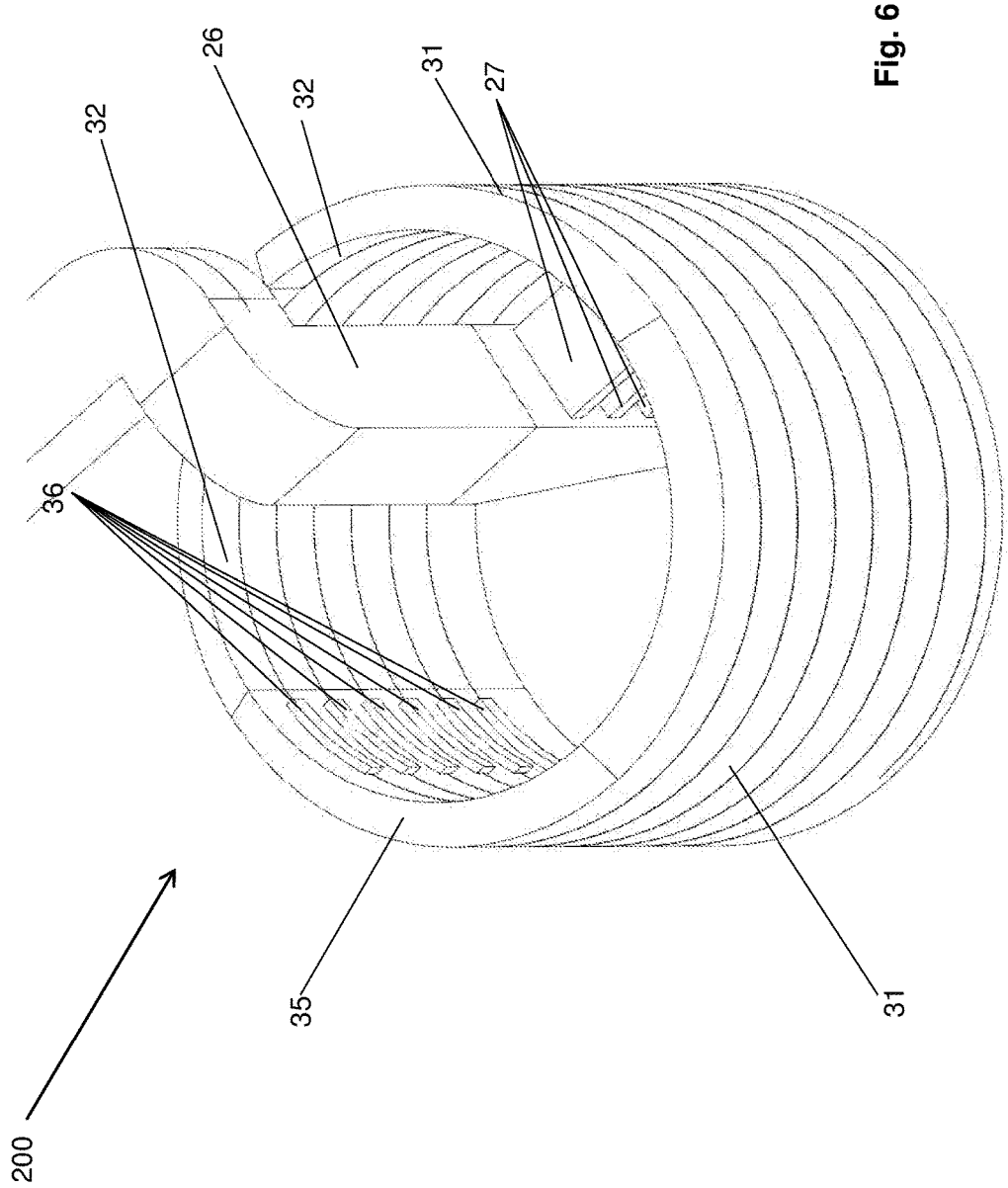
FIG. 6 is an axonometric view of the cooling apparatus of the invention.

The cooling tunnel allows to convey the cooling air to obtain a more effective, faster cooling. The cooling speed which depend on the flow rate of the air at the inlet and its initial temperature. A manifold 26, provided with a vertical conduit inside the casing 30, arranged parallel to said vertical central axis, is provided for the introduction of cooling air. The manifold 26 receives the cooling air from the specific systems (not shown in the figures). Horizontal conduits 27 ending with air mouths (see FIG. 2, 3, and FIG. 6) exit from the vertical walls of the manifold 26, which convey the cold air from the manifold 26 into the cooling tunnel towards the preforms P through the wall of the inner cylinder 32 of the casing 30. The air mouths for the introduction of cooling air are located between one turn and the other of the helical stretch 29 of the guide 21 so that the cold air can strike the preforms P for their entire length. FIG. 6 shows the manifold 26 with the horizontal conduits 27 for the introduction of cooling air into the cooling tunnel, and reference numeral 36 indicates the air outlet mouths located in nearly diametrically opposite position with respect to that for the introduction of cooling air and downstream with respect to the first.

The air outlet mouths 36 are also located on the walls of the inner cylinder 32 of the casing 30. The reciprocal position of the air inlet mouths and of the air outlet mouths produces a particularly advantageous fluid-dynamic air path of the cooling fluid, thus obtaining a greater efficiency. Because of the natural pressure difference between the inlet air and the outlet air, the air flow strikes the preforms in countercurrent manner for half a turn and in concurrent manner for the other half with respect to the movement of the preforms P which cross the helical stretch 29 of the guide 21 from the bottom upwards. The cooling tunnel and the method with which the air enters and exits the tunnel between one turn and other increases the energy efficiency of the cooling air flow creating cooling paths which appropriately brush the preforms which cross the helical stretch 29 of the guide 21, ensuring a uniform cooling in such a manner. The air outlet speed, especially in the case of use of super-light preforms for small size bottles, is determined to prevent the preforms P from oscillating by effect of their lightness to avoid the risk of not being grasped by the grippers when they are released. The air flow outlet speed depends on the features of the inlet air flow. By varying these factors it is possible to cool preforms of different weight and size in efficient manner. The casing, i.e. the cylindrical tower forming the cooling tunnel, allows to obtain cooling times which are much shorter than a traditional rail system in ambient air. The length of the helical stretch 29 of the guide 21 is determined according to the preform cooling needs, for example by the hourly number of units to be cooled, the inlet temperature, the thickness of the material which constitutes the preforms. According to these data, the length can be easily determined by a person skilled in the art. The described system has a considerable flexibility, in addition to obtaining a rapid, effective cooling because it allows to use the same system for the production of preforms of different weight and size simply by varying the physical parameters of the inlet cooling flow. The entire system can be easily dimensioned by means of fluid-dynamic analysis.

The invention claimed is:

1. An apparatus for cooling preforms P made of thermoplastic material, which comprises:
   a guide for the preforms P, which defines a cooling path comprising:
   a first substantially helical stretch, which develops about a vertical central axis, said first helical stretch being comprised between a lower plane and an upper plane, with start point A at the height of the lower plane and end point B at the height of the upper plane,
   a second substantially straight stretch arranged inside the first helical stretch, which starts in said end point B and continues from the top downwards ending at the lower plane, and
   a third stretch, located at the lower plane which joins an end point C of the second straight stretch with the start point A of the first helical stretch,
   a helical tunnel inside of which the turns of the first helical stretch of said guide run.

2. The apparatus according to claim 1, wherein the guide is crossed, along said entire cooling path, by a chain or by a cable to which a plurality of clips for grasping the preforms P is hooked.

3. The apparatus according to claim 2, wherein a hooking station for hooking the preforms P, by means of the clips, and where the preforms can be released after a cooling process, is located along said cooling path close to the start point A of the first helical stretch.

4. The apparatus according to claim 1, wherein there is provided a double wall cylindrical casing coaxial with said vertical central axis, and wherein outer vertical walls of the helical tunnel are formed by an outer wall of said double wall cylindrical casing and inner vertical walls of the helical tunnel are formed by an inner wall of the double wall cylindrical casing.

5. The apparatus according to claim 1, wherein the helical tunnel has a rectangular cross section, said rectangular cross section having longer sides parallel to said vertical central axis, and size such as to allow the passage of the preforms P.

6. The apparatus according to claim 4, wherein an upper wall and a lower wall of the helical tunnel, which form the floor and ceiling thereof, are constituted by a respective helical belt parallel to the turns of the first helical stretch.

7. The apparatus according to claim 4, wherein a manifold, formed by a vertical conduit inside the double wall cylindrical casing and parallel to said vertical central axis, is apt to receive cooling air from external systems and to convey said cooling air into said helical tunnel.

8. The apparatus according to claim 7, wherein the vertical conduit of the manifold is equipped with horizontal conduits each horizontal conduit ending with an air inlet mouth, adapted to introduce the cooling air into the helical tunnel, located on the inner wall of the double wall cylindrical casing between one turn and the other of the first helical stretch.

9. The apparatus according to claim 8, wherein there are provided air outlet mouths adapted to direct the cooling air injected into the helical tunnel along the cooling path in an opposite direction with respect to a direction of movement of the preforms P.

10. The apparatus according to claim 9, wherein said air outlet mouths are located on the inner wall of the double wall cylindrical casing, each air outlet mouth of said air outlet mouths being downstream of, and approximately diametrically opposite to, a corresponding air inlet mouth.

11. The apparatus according to claim 7, wherein physical parameters of a cooling air flow at an inlet of the helical tunnel are adjustable.

12. The apparatus according to claim 11, wherein the physical parameters of the cooling air flow at the inlet of the helical tunnel are determined according to size and weight of the preforms and to cooling speed.

13. The apparatus according to claim 1, adapted to manage preforms weighing less than 16 g and with a body having a diameter smaller than a diameter of a neck.

* * * * *